L. ROUANET.
BALL OR ROLLER BEARING CAGE.
APPLICATION FILED FEB. 21, 1919.
1,320,096.
Patented Oct. 28, 1919.
2 SHEETS—SHEET 1.
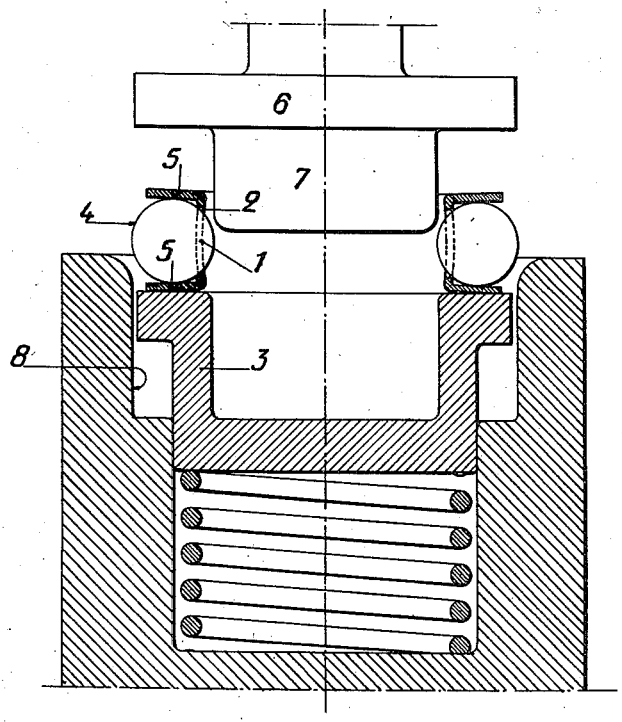
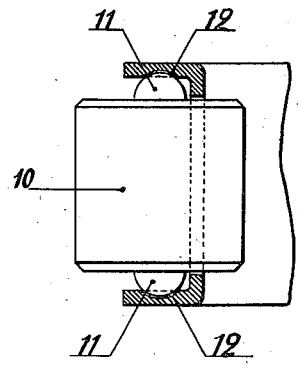
INVENTOR:
Louis Rouanet
By Wm Wallace White
ATTY L. ROUANET.
BALL OR ROLLER BEARING CAGE.
APPLICATION FILED FEB. 21, 1919.
1,320,096.
Patented Oct. 28, 1919.
2 SHEETS—SHEET 2.
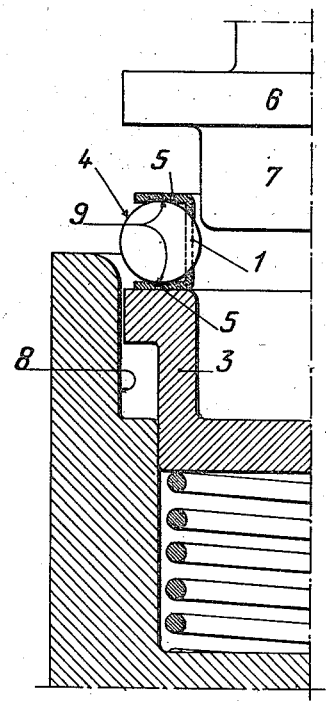
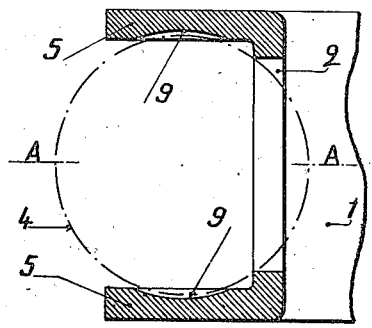
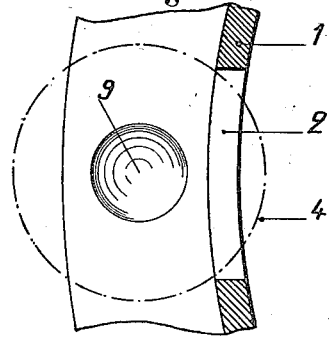
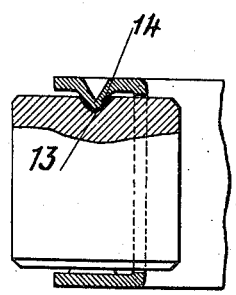
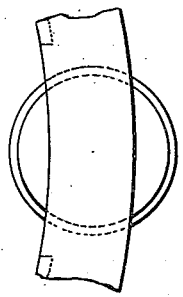
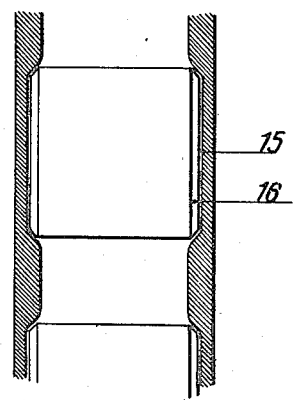
INVENTOR:
Louis Rouanet
BY Wm Wallace White
ATT'Y.

UNITED STATES PATENT OFFICE.

LOUIS ROUANET, OF IVRY-PORT, FRANCE, ASSIGNOR TO COMPAGNIE D'APPLICATIONS MECANIQUES, OF IVRY-PORT, SEINE, FRANCE.

BALL OR ROLLER BEARING CAGE.

1,320,096.  Specification of Letters Patent.  Patented Oct. 28, 1919.

Application filed February 21, 1919. Serial No. 278,438.

*To all whom it may concern:*

Be it known that I, LOUIS ROUANET, citizen of the Republic of France, residing at 42 Rue Franklin, Ivry-Port, Seine, in the Republic of France, have invented new and useful Improvements in Ball or Roller Bearing Cages, of which the following is a specification.

This invention relates to a ball or roller cage as well as to its process of manufacture and consists in the use—for the production of such a cage—of an annular piece of any section suitable for the result which it is desired to obtain, between the side walls of which the carrying members,—balls or rollers,— are previously introduced by pressure while taking advantage of the elasticity of the material and serve themselves as punches or dies at two diametrically opposed points or at the two ends of an axis respectively in the case of balls or rollers, for the purpose of causing them to form in the material of the cage impressions or alveoles which constitute their final housing. This housing is obtained by means of an embossing operation.

According to this invention, a blank is used of such material which may—at the time of the embossing operation—receive a permanent deformation (impression) in some of its surfaces, while it may on the other hand be able to bear an elastic deformation throughout.

The said deformation should be made without the least damage to the carrying members.

With the new cage wherein the carrying members themselves serve to form the impression intended to be their housing, the said members may move freely in such housings in all directions without being able to drop out, while they can be readily removed by utilizing the elasticity of the material.

This invention will be more readily understood by reference to the accompanying drawings given by way of example and wherein the deformations are amplified for a better comprehension.

Figure 1 shows the mode of manufacture of the cage the various parts being in position before the embossing operation.

Fig. 2 is a similar view to that of Fig. 1 during the embossing operation.

Fig. 3 is a similar view to that of Figs. 1 and 2 after the embossing operation.

Fig. 4 shows at an enlarged scale part of a ball cage according to the invention.

Fig. 5 is a horizontal section on line A—A of Fig. 4.

Figs. 6 to 9 show different roller cages obtained by the same method.

The example shown in Figs. 1 to 5 relates to a ball cage having a U shaped section, the side flanges being folded perpendicularly to the cage body.

The cage 1 which has been previously perforated with suitable radial holes 2 is placed upon a matrix 3 in order to be furnished by any suitable means with the number of balls 4 which it is intended to carry when finished. The balls suitably distributed over the periphery of the cage 1 are introduced by pressure between the side flanges thereof while taking advantage of the elasticity of the material.

When the cage and the balls are thus arranged, the press platen 6 is allowed to act, this platen being provided with a cylindrical extension 7 having for its object to insure the inner centering of the balls 4, while their outer centering is obtained by the matrix bore 8.

Under the action of this press:

(*a*) The cage flanges 5 are subjected, under the action of the balls 4, to permanent deformations which result for each one of them in a number of impressions 9 equal to the number of balls. (*b*) The whole of the cage 1 is subjected to an elastic deformation which affects specially the body of the cage as clearly shown in Fig. 2 of the accompanying drawings. The press platen 6 is subsequently raised, the elastic deformations disappear while the permanent deformations 9 form housings for the balls 3 wherein they are imprisoned, although able to move freely in all directions.

The cage thus obtained is shown partly at an enlarged scale in Figs. 4 and 5.

Figs. 6 to 9 show roller cages obtained according to the same method.

In the cage shown in Fig. 6 the rollers 10 carry spherical parts 11 which at the time of the embossing operation serve as dies or punches to form the impressions 12 wherein the rollers are caged up while being free to move in all directions.

In the cage shown in Fig. 7 the rollers are hollowed out at 13 at each end and a suitable matrix forms in the side flanges of the case impressions 14 corresponding to the cavities 13.

In the case shown in Figs. 8 and 9 a suitable matrix forms in the case walls impressions 15 corresponding to the ends 16 of the rollers.

Endless modifications could be made, by modifying the shape of the parts arranged in the cage, but it must be well understood that the chief object of this invention is the use of the parts in the said cage for the formation by means of an embossing operation of impressions in the material, the said impressions serving as a suitable housing for the said parts.

Having now described my invention, what I claim as new and desire to secure by Letters Patent is:

1. An improved process for the construction of cages for ball or roller bearings consisting in pressing the walls of the cage blank upon the carrying members (balls or rollers) so that the latter acting after the manner of punches or dies form each by embossing two opposed impressions in the material of the cage at the same time as the whole of the latter is subjected to an elastic deformation of such a nature that when the pressure is relieved, the balls or rollers may revolve freely on their own axis although imprisoned at the same time in the impressions which thus become their housing.

2. An improved process for the construction of cages for ball or roller bearings consisting in providing a cage blank in the form of a U shaped ring, introducing the carrying members (balls or rollers) between the ring flanges, subjecting the whole together to a pressure compelling the U branches to close while simultaneously causing the elastic deformation of the cage body and the formation of permanent impressions in the said branches under the embossing action of the carrying members (balls or rollers) working after the manner of punches or dies, causing then by relieving the pressure the elastic deformation of the cage while letting the impressions remain, so as to allow the balls or rollers to revolve freely on their own axis while tightly holding them in the impressions which thus become their housing.

3. An improved process for the construction of cages for ball or roller bearings consisting in the use of a U shaped ring of such material as will allow an elastic deformation of the whole and the formation of permanent impressions in the branches of the U, in piercing suitably spaced radial holes in the cylindrical ring body, in introducing by force and pressure the carrying members (whether balls or rollers) between the U branches or ring flanges by taking advantage of the elasticity of the substance of this ring and in such a manner that each carrying member (balls or rollers) may partly enter one of the holes provided in the ring body, in subsequently subjecting the cage thus furnished with the carrying members to the action of a press so as to bring the branches of the U together and thus simultaneously causing the elastic deformation of the cage body and the formation of permanent impressions in the said branches under the embossing action of the carrying members (balls or rollers) acting after the manner of punches or dies, lastly in relieving the pressure which causes the elastic deformation of the cage to disappear while leaving the impressions and allowing the balls or rollers to revolve freely on their own axis while holding them imprisoned in the impressions which thus become their housings.

In testimony whereof I have signed my name to this specification.

LOUIS ROUANET.